UNITED STATES PATENT OFFICE.

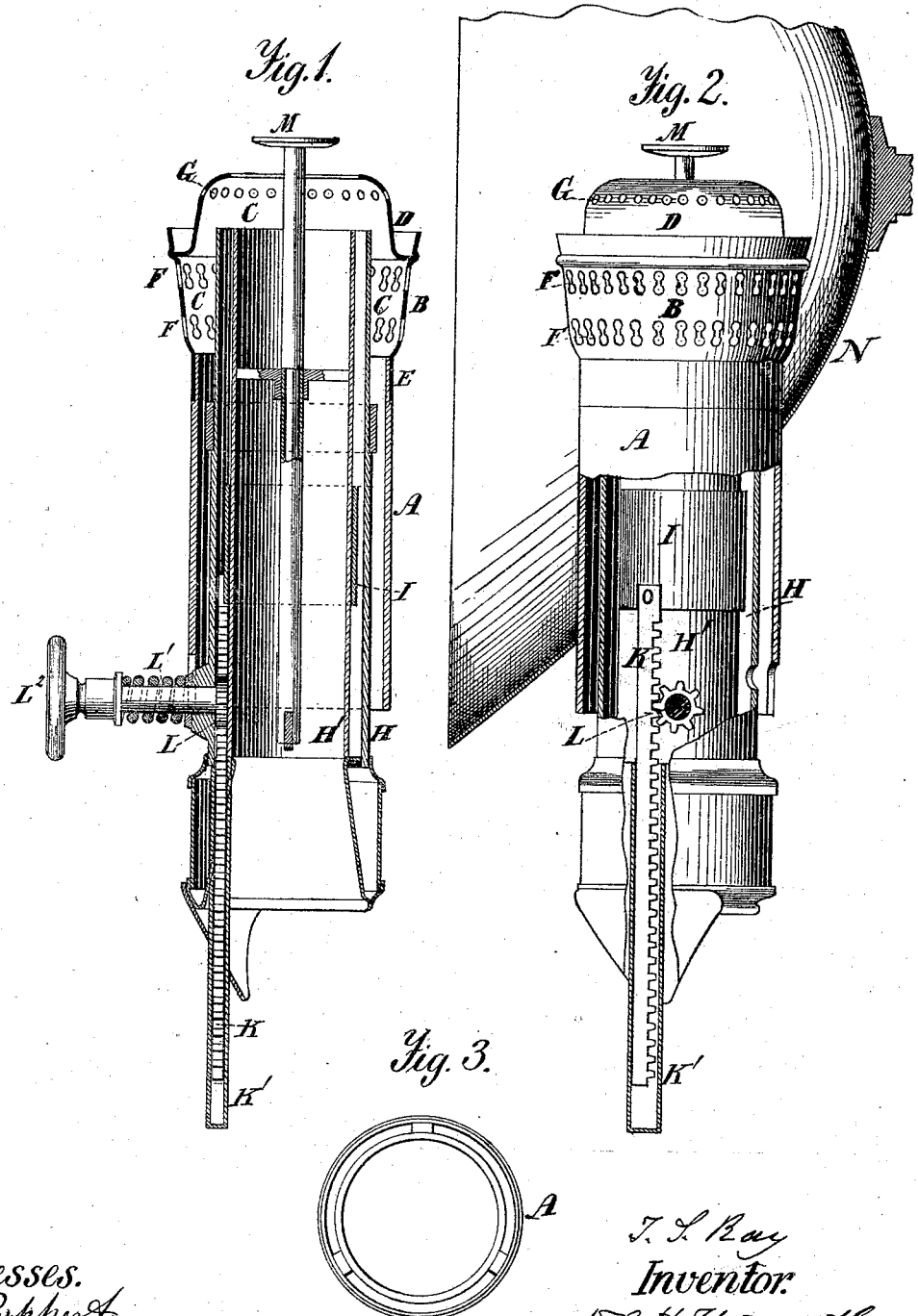

THOMAS S. RAY, OF BUFFALO, NEW YORK.

IMPROVEMENT IN LOCOMOTIVE HEAD-LIGHTS.

Specification forming part of Letters Patent No. 147,283, dated February 10, 1874; application filed October 20, 1873.

*To all whom it may concern:*

Be it known that I, THOMAS S. RAY, of Buffalo, in the county of Erie and State of New York, have invented a new and useful Improvement in Locomotive Head-Light Burners, of which the following is a specification:

This invention relates to that kind of locomotive head-light burners in which the ordinary annular wick-tube is encircled by a vertical air-tube, to direct vertically-ascending currents of air to the outside of the annular flame, the upper end of such tube being enlarged, and perforated for the entrance of air laterally. My improvement consists in elongating the exterior air-tube so that its lower end shall reach through the reflector, to prevent any drippings or overflow of oil from being spattered, by the vibrations of the burner when the locomotive is in motion, upon its reflecting-surface, and injuriously affecting its power.

Figure 1 is an axial section of my improved burner, showing also a portion of the reflector of a locomotive head-light. Fig. 2 is a sectional elevation. Fig. 3 is a transverse horizontal section.

The same letters of reference are used in all the figures in the designation of identical parts.

The wick-tube consists, as usual, of two concentric cylinders, H and H', between which the annular wick is inserted, which is raised and lowered through the medium of the ring I, rack K, pinion L, and shaft $L^1$ $L^2$. Air is supplied to the interior surface of the annular flame through the open-ended cylinder H' of the wick-tube; and the air for the exterior surface of the flame is drawn through the tube A encircling the wick-tube, the air entering at its lower open end, as well as through the perforations F in the wall of its upper end B, which is suitably enlarged to increase the aggregate area of the perforations F. In the example illustrated, the end B is made separate from and slipped upon the main part of the tube A, and terminates on top in a chimney-gallery and the deflector D, which is perforated, as usual, at G. The button M, above the deflector, is supported upon a central stem rising from the interior cylinder H' of the wick-tube. The air-tube A is sufficiently elongated to reach, when the burner is properly attached to the oil-reservoir, through the reflector N, and thus prevents the spattering of drippings upon its reflecting-surface. The tube A is made as small as possible, so that but a slightly larger opening needs to be cut in the reflector than ordinarily; and, on account of this contracted nature of its main body, the enlargement of its upper end becomes very important, in providing the means for supplying the required amount of air to the outer surface of the flame.

What I claim as my invention, and desire to secure by Letters Patent, is—

The annular wick-tube, in combination with an encircling air-tube, A, provided with an enlarged perforated upper end, B F, and with its lower end extended downward through the reflector, substantially as and for the purposes specified.

THOS. S. RAY.

Witnesses:
D. P. HOLLOWAY,
B. EDW. J. EILS.